United States Patent

Kishi et al.

[11] Patent Number: 5,353,856
[45] Date of Patent: Oct. 11, 1994

[54] PNEUMATIC RADIAL TIRE

[75] Inventors: Atao Kishi; Kazuyuki Kabe, both of Hiratsuka, Japan

[73] Assignee: The Yokohama Rubber Company, Ltd., Tokyo, Japan

[21] Appl. No.: 70,997

[22] Filed: Jun. 4, 1993

[30] Foreign Application Priority Data

Jun. 8, 1992 [JP] Japan ................... 4-147310

[51] Int. Cl.$^5$ ............ B60C 3/00; B60C 9/02; B60C 9/20; B60C 11/00
[52] U.S. Cl. ................ 152/209 R; 152/454; 152/534; 152/548
[58] Field of Search ............ 152/209 R, 454, 534, 152/548

[56] References Cited

U.S. PATENT DOCUMENTS

| | | | |
|---|---|---|---|
| 4,258,773 | 3/1981 | de Saint-Michel | 152/454 |
| 4,445,560 | 5/1984 | Musy | 152/454 X |
| 4,481,994 | 11/1984 | Pommier | 152/454 |
| 4,785,861 | 11/1988 | Fujiwara | 152/454 X |
| 4,955,416 | 9/1990 | Takeuchi et al. | 152/454 |
| 4,976,300 | 12/1990 | Takehara et al. | 152/454 |
| 5,196,076 | 3/1993 | Ochiai | 152/454 |

Primary Examiner—Michael W. Ball
Assistant Examiner—Adrienne C. Johnstone
Attorney, Agent, or Firm—Nikaido, Marmelstein, Murray & Oram

[57] ABSTRACT

A pneumatic radial tire formed so that, when the tire is inflated from a non-inflated state, in which the inner pressure thereof is 5% of a normal lever, to a normal inner pressure, a central region of the outer surface of the tread in a meridional cross section of the tire which is between two points $P_1$, $P_1'$ spaced from the center $P_0$ of a tread width to left and right along the outer surface of the tread by a distance L, which is expressed by the formula $0.25TW \leq L < 0.50TW$, with respect to a width TW of a ground contacting portion of the bread grows outward in the radial direction of the tire, shoulder regions on both outer sides of the two points $P_1$, $P_1'$ contracting inward in the radial direction of the tire, with a radius of curvature $R_2$ of a region, which is formed between two intermediate points $P_2$, $P_2'$, which are positioned halfway respectively between the center $P_0$ of the tread width and shoulder end portions on the left and right sides thereof, in such a manner that this region includes the two intermediate points $P_2$, $P_2'$, varying to be smaller than a radius of curvature $R_1$ of the same region in a non-tire-inflated state.

6 Claims, 4 Drawing Sheets

5,353,856

PNEUMATIC RADIAL TIRE

BACKGROUND OF THE INVENTION

This invention relates to a pneumatic radial tire having an improved durability of a belt, and more particularly to a pneumatic radial tire for heavy duty use.

In a pneumatic tire, a plurality of belt plies are provided on the outer side of at least one carcass ply reinforced with carcass cords arranged at angles in the range of 90°±20° with respect to the circumferential direction of the tire the shape of the tire is stabilized because the tensile force of the belt layer when the tire is inflated. A conventional pneumatic tire for heavy duty use is designed so that, when the tire is fitted on a proper rim and inflated, the tensile force T is distributed uniformly across the entire widthwise direction as shown in FIG. 6. The tread surface of a conventional tire is shown by a broken line 11 in FIG. 3 in a meridional cross section of this pneumatic radial tire for heavy duty use at 5% of a normal inner pressure. The tire grows at the tread surface as a whole in the radially outward direction of the tire substantially uniformly as shown by a solid line 12, after the tire has been inflated to a normal inner pressure.

In a conventional radial tire, the tensile force T is thus imparted uniformly to the entire belt layer, so that an extremely high inter-belt-layer shearing force is exerted repeatedly on the widthwise edge portions of the belt layer during the travelling of the vehicle. In consequence, heat is generated in the edge portions of the belt layer tending to separate the cords from coating rubber. This decreases the durability of the belt.

In order to prevent the generation of heat in the edge portions of the belt, a compound (rubber composition) of a low heat build-up has been used as tread rubber, or the gauge thickness of the shoulder portions has been reduced. However, when a compound of a low heat build-up is used, the wet gripping capability (road surface grasping capability of the tire during the travelling of the vehicle on a wet road) of the tire decreases. When the gauge thickness of the shoulder portions is reduced thoughtlessly, the uneven-abrasion resistance of the tire lowers, and the shoulder portions wear earlier.

SUMMARY OF THE INVENTION

An object of the present invention is to provide a pneumatic radial tire in which the durability of the belt layer is improved without causing a decrease in the other characteristics of the tire, especially, a pneumatic radial tire suitable for heavy duty use.

To achieve this object, the present invention provides a pneumatic radial tire having a tread, at least one carcass ply inscribed on the tread and extending to left and right beads, and a plurality of belt plies disposed on the treadside of an outer circumferential portion of the at least one ply carcass which tire is characterized in that, when the tire is inflated from a non-inflated state, in which the inner pressure thereof is 5% of a normal level, to a normal inner pressure, a central region of the outer surface of the tread in a meridional cross section of the tire which is between two points $P_1$, $P_1'$ spaced from the center $P_0$ of a tread width to left and right along the outer surface of the tread by a distance L, which is expressed by the formula $0.25TW \leq L < 0.50TW$, with respect to an axial tread width TW of a ground contacting portion of the tread grows outward in the radial direction of the tire, shoulder regions on both axially outer sides of the two points $P_1$, $P_1'$ contracting inward in the radial direction of the tire, with a radius of curvature $R_2$ of a mid-region defined between two intermediate points $P_2$, $P_2'$, axially positioned halfway respectively between the center $P_0$ of the tread width and the shoulder end portions on the left and right sides thereof along the outer surface of the tread, in such a manner that this mid-region includes these two intermediate points $P_2$, $P_2'$ becomes smaller than a radius of curvature $R_1$ of the mid-region in a non-tire-inflated state.

According to the present invention, the direction in which the tread surface grows when the tire is inflated is thus determined, so that the distribution of the tensile force of the belt plies during the inflation of the tire is set to the lowest possible level in the edge portions thereof. This enables the inter-belt-layer shearing force exerted on the edge portions of the belt plies to be minimized, and the occurrence of separation of cords and coating rubber to be prevented.

The "normal inner pressure" referred to above means an inner pressure prescribed in JATMA (Japan Tire Standards). The "5% of a normal inner pressure" means an inner pressure which retains a tire in a shape substantially identical with that of a relative tire molding metal mold (normal condition of a tire in a non-inflated state).

DESCRIPTION OF THE PREFERRED EMBODIMENTS

Figure 1:
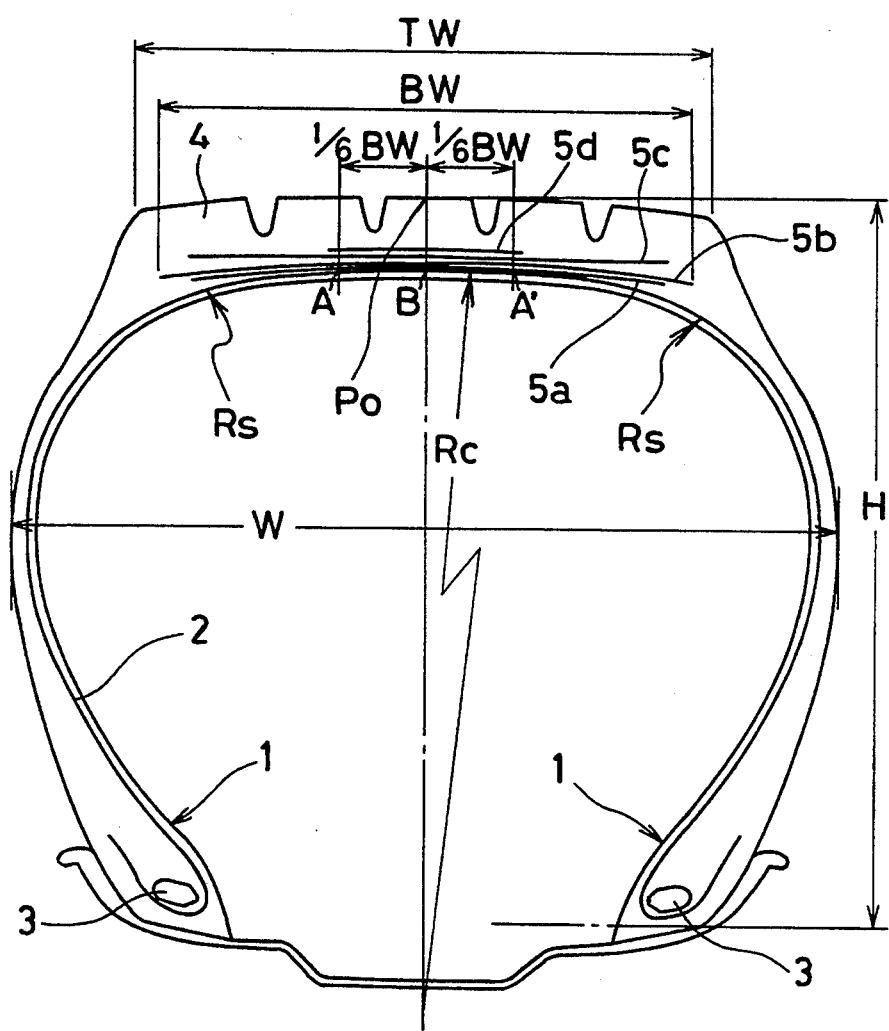
FIG. 1 is a meridional cross section of an example of the pneumatic radial tire designed for heavy duty use according to the present invention.

Referring to FIG. 1, a single carcass ply 2 is provided between beads 1, 1. The end portions of the carcass ply 2 are turned back around bead cores 3 from the axial inner side to the axial outer side of the tire and wound up. This carcass ply 2 is reinforced with steel cords or organic fiber cords. More than one carcass ply 2 may also be provided. On the outer side of the carcass ply 2, four belt plies 5a, 5b, 5c, 5d reinforced with steel cords are arranged annularly over the whole circumference of the tire 1 in the tread portion. The first belt ply 5a counted from the carcass ply 2 toward the outer surface of the tread is provided mainly to improve the bend rigidity of the tread, and has a cord angle with respect to the circumferential direction of the tire of around 40°–75°. On the other hand, the second and third belt plies 5b, 5c are provided mainly as tension-resisting plies with respect to the circumferential direction of the tire, and have a cord angle of 10°–30°, the cords in the different plies crossing each other and extending in opposite directions. The fourth belt ply 5d is provided mainly as a protective ply for the belt plies and is not always necessary. The cord angle of the fourth belt ply 5d is around 20°. Although the second and third belt plies 5b, 5c of these four belt plies 5a, 5b, 5c, 5d have do cross the cords of each other in a specific relationship, the cords in different plies in the first and second belt plies 5a, 5b and third and fourth belt layers 5c, 5d may or may not cross each other.

Figure 2:
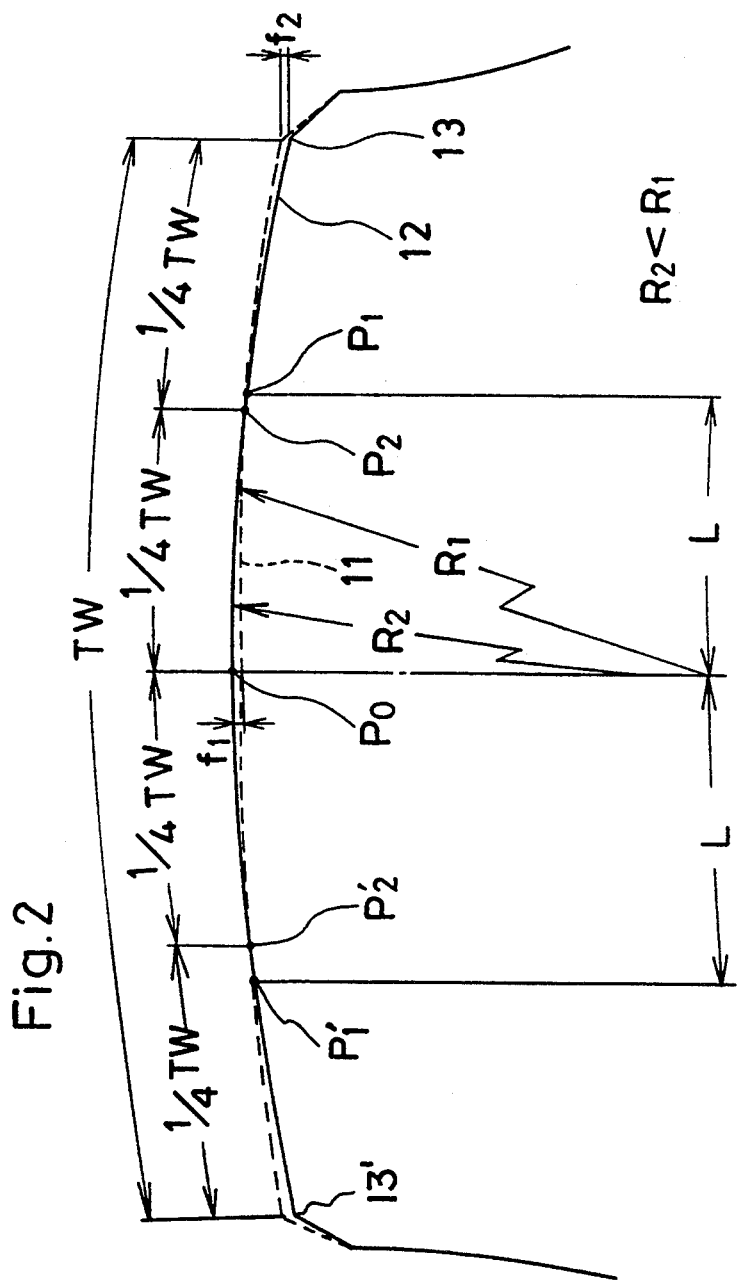
FIG. 2 illustrates the direction of growth of a tread surface in a meridional cross section of the pneumatic radial tire in an inflated state according to the present invention.

When the tire according to the present invention thus formed is fitted on a proper rim and inflated from an inner pressure of 5% of a normal level to a normal inner pressure, the tread surface in a meridional cross section of the tire varies from the broken line 11 to the solid line 12 as shown in FIG. 2. Namely, the portions of the tread surface which extend from the center $P_0$ of a tread width to points $P_1$, $p_1'$ axially spaced along the tread surface from the center $P_0$ toward shoulder portions by a distance L grow outward in the radial direction of the tire, while the portions of the tread surface which axially extend between the points $P_1$, $p_1'$ and shoulder ends 13,13' (edges) contract in the opposite direction, i.e., inward in the radial direction of the tire. In short, the portion of the tread surface which is in a central region extending to both axial sides of the center $P_0$ of the tread width to the point $P_1$, $p_1$40 spaced from the center $P_0$ toward the shoulders by a distance L grows (expands) outward in the radial direction of a tire but the remaining portions of the tread surface which are in shoulder regions extending from the points $P_1$, $p_1'$ to the shoulder ends 13, 13' contract inward in the radial direction of the tire. Accordingly, at either of the points $P_1$, $p_1'$ the tread surface neither grows nor contracts. The radius of the portion of the tread surface of the tire in an uninflated state which passes through three points, i.e. the center $P_0$ of the tread width and the intermediate points $P_2$, $P_2'$ which are halfway between the center $P_0$ and the two shoulder ends 13, 13' becomes smaller when the tire is inflated.

In the above-described structure, it is preferable that a maximum length of growth $f_1$ of the central region and a maximum length of contraction $f_2$ of the shoulder regions of the tread surface of the tire inflated to a normal inner pressure be set to larger than 0.5 mm and 0.2 mm respectively.

Figure 5:
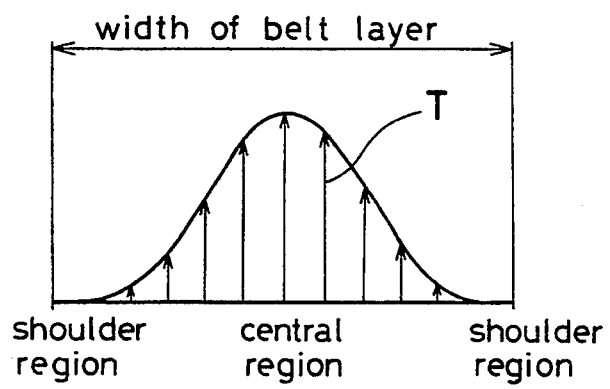
FIG. 5 illustrates the distribution of a tensile force of the belt layer in the pneumatic radial tire according to the present invention.
Figure 6:
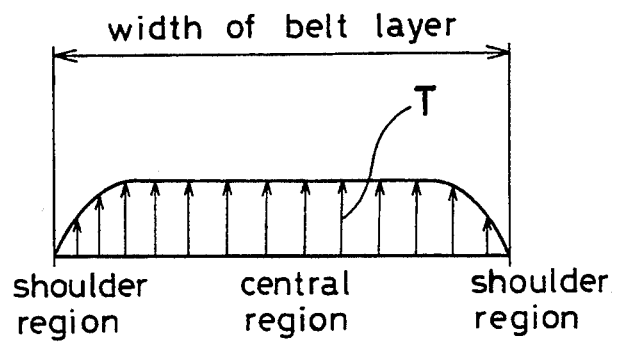
FIG. 6 illustrates the distribution of a tensile force of the belt layer in a conventional pneumatic radial tire.

The tire is thus formed so that the tread surface thereof varies in the following manner when the tire is inflated to a normal inner pressure. The central region extending from the center $P_0$ of a tread width to the points $p_1$, $p_1'$ which are spaced therefrom toward the shoulder portions grows outward in the radial direction of the tire, while the shoulder regions extending from the points $P_1$ to the shoulder 13, 13' contracts inward in the radial direction of the tire with the radius of the surface of the central portion of the tread which passes the three points, i.e. $P_0$, $P_2$, $P_2'$ varying to be smaller. This enables the distribution of the tensile force of the belt plies 5a, 5b, 5c, 5d with respect to the widthwise direction of the tire to be set as shown in FIG. 5. Namely, the tensile force T can be set high in the central region, and to substantially zero in the shoulder edge portions. Therefore, the inter-belt-layer shearing strain in the shoulder edge portions can be minimized.

Figure 4:
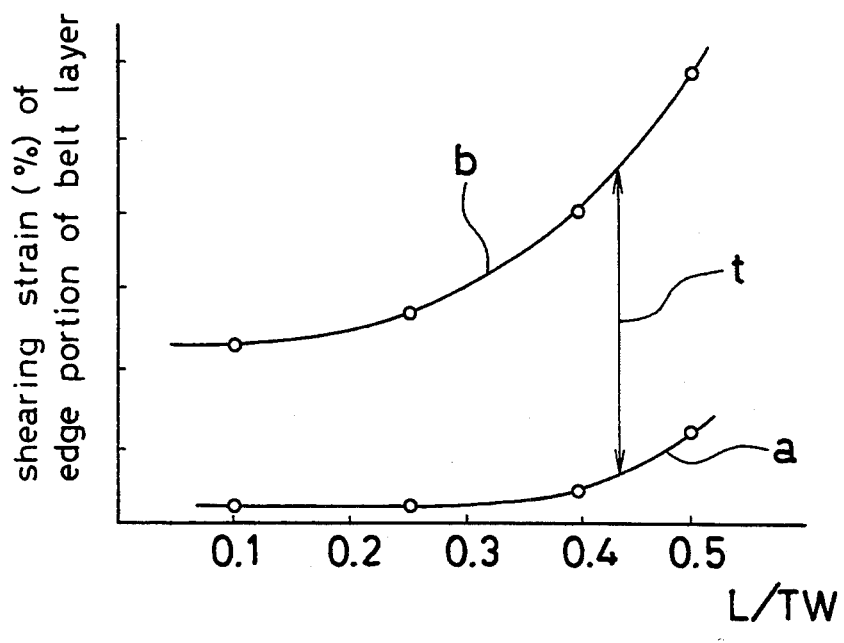
FIG. 4 is a graph showing the relation between the shearing strain (%) of the edge portions of the belt layer and L/TW.

The shearing strain occurring among the belt plies in the above-described structure when the tire is rolled with a load (standard load prescribed in JATMA) imparted thereto varies as shown in FIG. 4. The drawing shows that, when the distance L between the points $P_1$, $p_1'$, $P_0$ mentioned above is varied, the shearing strain a of the shoulder edge portions among the belt plies of the tire in a no load state and that b of the same shoulder edge portions in a load-imparted state becomes different, and that a difference t between the two values varies a, b greatly.

According to the present invention, the ratio L/TW of the distance L for setting the points $P_1$, $p_1'$ to the width TW of the ground-contacting portion of the tread is set to satisfy 0.25TW≦L<0.50TW in view of the results shown in FIG. 4. This ratio is set more preferably to satisfy 0.25TW≦L<0.38TW. Referring to FIG. 4, a reference letter t denotes a difference between the shearing strain a of the edge portions of the belt layer in a tire in a non-load-imparted state and that b of the same edge portions in the tire in a load-imparted state. This difference ± has correlation with an energy loss. As may be understood from FIG. 4, the shearing strain of the edge portions of the belt plies in a tire in a standard load-imparted state suddenly increases when the distance L becomes, greater than 0.50 TW. When the distance L is smaller than 0.25 TW, the shearing strain of the edge portions of the belt plies of the tire in a standard load-imported state does not become large but setting the distance L smaller than 0.25 TW is difficult for manufacturing reasons.

What are shown in FIG. 4 are the results of measurement of shearing strain in the edge portions of the belt layer in a pneumatic radial tire for heavy duty use which has a tire size of 11R 22.5 14PR and a structure shown in FIG. 1. The shearing strain of the edge portions of the belt layer which is referred to in the above paragraphs in measured in a position between the second and third belt plies 5b, 5c which work as tension-resisting plies with respect to the circumferential direction of the tire, in which position the largest shearing strain occurs in the belt layer.

The tire according to the present invention having the above-described structure can be obtained by setting a radius of curvature Rc of a central region of a carcass line in a tire, which is fitted on a proper rim and in a non-inflated state in which the inner pressure of the tire is 5% of a normal level, in the following manner in relation with a maximum width BW of the belt plies. The carcass line passes through the radial thickness center of a single carcass ply when the carcass structure comprises a single carcass ply or the radial thickness center of a total thickness of all of the carcass plies when the carcass structure comprises plural carcass plies. Namely, the tire is formed as shown in FIG. 1, in such a manner that a radius of curvature Rc (mm) of a carcass line, which passes three points including a point B on the innermost carcass layer corresponding to the center $P_0$ of the tread width, and points A, A' are at positions on the innermost carcass layer which are spaced from the point B to left and right in the widthwise direction of the tire by a distance equal to 1/6 of the width BW of the widest belt ply, which is a belt ply 5b in the embodiment of FIG. 1, satisfies the following equation, and in such a manner that a radius of curvature Rs (mm) of those portions of the carcass line between the points A, A' and two shoulder end portions becomes smaller than that Rc. The radius of curvature Rs is one in a tire, which is fitted on a proper rim and in a non-inflated state in which the inner pressure of the tire-is 5% of a normal level.

$$Rc = C \cdot (W/H)^6$$

wherein C is a constant in the range of 500–700; W a maximum width (mm) of a tire filled with air to a normal inner pressure; and H the height (mm) in cross section of a tire filled with air to a normal inner pressure.

The radius of curvature Rc of the carcass line set in accordance with this equation is markedly large as compared with that of the corresponding carcass line of a conventional tire of this kind, and it is characteristic that the central region of the carcass line is approximately linear. Accordingly, when this tire is inflated, the central region of the tread surface grows outward in the radial direction of the tire, and the shoulder regions thereof contract inward in the same radial direction. For reference, the C in the above formula is in the range of around 70-250 in a conventional pneumatic radial tire, and the tread surface as a whole of the tire grows substantially uniformly in the radially outward direction thereof.

EXAMPLE

A tire according to the present invention and a conventional tire were manufactured which had the following different features and common features including a tire size of 11R 22.5 14PR, a tire structure of FIG. 1, a carcass ply 2 reinforced with steel cords, a belt ply 5a reinforced with steel cords and having a cord angle of 58° and a width of 145 mm, a belt ply 5b reinforced with steel cords and having a cord angle of 18° and a width of 175 mm, a belt ply 5c consisting of steel cords and having a cord angle of 18° and a width of 155 mm, and a belt ply 5d reinforced with steel cords and having a cord angle of 18° and a width of 70 mm, the cords in the belt plies 5a, 5b extending in the same direction with respect to the circumferential direction of the tire, the cords in the belt plies 5b, 5c extending in different directions with respect to the circumferential direction of the tire, the cords in the belt plies 5c, 5d extending in the same direction with respect to the circumferential direction of the tire. The durability of the belts in these tires was evaluated by the following measuring method. The results are shown in Table 1.

(1) Tire according to the present invention:

---
C = 530. W = 265 mm. H = 240 mm. Rc = 960 mm.
Rs = 75 mm. TW = 188 mm. BW = 175 mm.
---

When the tire is fitted on a proper rim and inflated from an inner pressure which is 5% of a normal level to a normal inner pressure, the central region of the tread surface which is or the inner side of points $P_1$, $p_1'$ which are away by L=75 mm (L/TW=0.4) on the same surface, grows outward in the radial direction of the tire, and the shoulder regions on the outer side of the points $P_1$, $P_1'$ contract inward in the radial direction of the tire.

Figure 3:
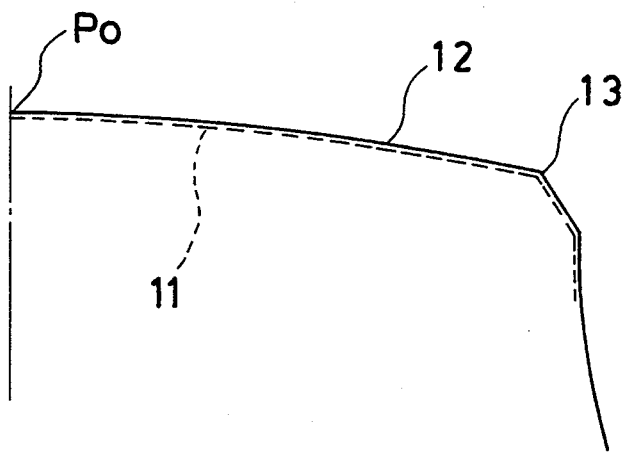
FIG. 3 illustrates the direction of growth of a tread surface in a meridional cross section of a conventional pneumatic radial tire in an inflated state.

(2) Conventional tire:

When the tire is fitted on a proper rim and inflated from an inner pressure which is 5% of a normal level to a normal inner pressure, the tread surface thereof as a whole grows outward in the radial direction of the tire as shown in FIG. 3.

---
C = 199. W = 265 mm. H = 240 mm. Rc = 360 mm.
---

-continued

---
Rs = 85 mm. TW = 188 mm.
---

Method of evaluating heating in the belt edge portions:

The tires in which holes 3 mm in diameter were made in the edge portions of the widest belt plies 5b and the edge portions of the belt plies 5c disposed on the outer side of the belt plies 5b from their respective tread surfaces were set on a drum in an indoor drum test machine and rolled at a speed of 80 km/h for 2 hours with a standard load imparted to the tires. After the completion of the travelling test, the temperatures of the edge portions of the widest belt plies 5b and the edge portions of the belt plies 5c disposed on the outer side of the belt plies 5b were measured, and the durability of the belts was evaluated on the basis of the measurement results. The results of evaluation are shown by indexes based on 100 which represents the actual temperatures of the edge portions of the belt layers in the conventional tire.

TABLE 1

|  |  | Tire according to the present invention | Conventional tire |
|---|---|---|---|
| Actual temperature (index) | 5b edge | 85 | 100 |
|  | 5c edge | 60 | 100 |

As may be noted from Table 1, the temperatures of the edge portions of the belt layer in the tire according to the present invention do not increase as compared with those of the corresponding portions of the conventional tire. This shows that the tire according to the present invention is superior to the conventional tire with respect to the durability of the belt layer therein.

According to the present invention described above, the tire according thereto is formed so that, when the tire is inflated, the central region of the tread surface which is between the center $P_0$ of the tread width and the points $P_1$, $p_1'$ grows outward in the radial direction of the tire with shoulder regions between these points $P_1$, $p_1'$ and shoulder edge portions contacting inward in the same radial direction. Therefore, the inter-belt-layer shearing strain exerted on the edge portions of the belt layer is reduced to nearly zero, so that the resistance of the belt layer to the separation thereof can be improved.

What is claimed is:

1. A pneumatic radial tire having a tread, at least one carcass ply inscribed on said tread and extending to left and right beads, and a plurality of belt plies disposed on the tread side of an outer circumferential portion of said at least one carcass ply, the tire being characterized in that, when said tire is inflated from a non-inflated state, in which the inner pressure thereof is 5% of a normal level, to a normal inner pressure: a central region of the outer surface of said tread in a meridional cross section of said tire which is between two points $P_1$, $P_1'$ axially spaced from the center $P_0$ of a tread width to the left and right along the outer surface of said tread by a distance L, which is expressed by the formula $0.25TW \leq L < 0.50TW$, with respect to an axial tread width TW of a ground contacting portion of said tread grows outward in the radial direction of said tire; shoulder regions on both axially outer sides of said two points $P_1$, $P_1'$ contracting inward in the radial direction of said tire; a radius of curvature $R_2$ of a mid region formed between two intermediate points $P_2$, $P_2'$, axially positioned halfway respectively between the center $P_0$ of said tread width and shoulder end portions on the left and right sides thereof along the outer surface of the tread, in such a manner that this mid region includes said two intermediate points $P_2$, $P_2'$, and becomes smaller than a radius of curvature $R_1$ of the same mid region in a non-tire-inflated state; and a radius of curvature Rc in mm of a carcass line in said central region formed between two points A,A', which are spaced from a point B at an axial position on said at least one carcass ply corresponding to said center $P_0$ of the tread width to left and right by a distance equal to 1/6 of a maximum width BW of said belt plies, in such a manner that said central region includes said point B and said two points A,A', has, when said tire is in a non-inflated state, a value defined by the equation $Rc = C \cdot (W/H)^6$, wherein C is constant in the range of 500–700, W a maximum width in mm of said tire filled with air to a normal inner pressure, and H the height in mm in cross section of said tire filled with air to a normal inner pressure, a radius of curvature Rs of carcass lines in said shoulder regions on the outer sides of both of said two points A, A' being smaller than said radius of curvature Rc.

2. A pneumatic radial tire according to claim 1, wherein said at least one carcass layer is reinforced with steel cords.

3. A pneumatic radial tire according to claim 1, wherein said plurality of belt layers are reinforced with steel cords.

4. A pneumatic radial tire according to claim 1, wherein said at least one carcass ply is only one ply, said belt layers being four plies.

5. A pneumatic radial tire according to claim 4, wherein a first belt ply counted from said at least one carcass ply toward the tread surface is reinforced with cords and has a cord angle with respect to the circumferential direction of said tire of 40°–75°, second and third belt plies are reinforced with cords having a cord angle with respect the circumferential direction of said tire of 10°–30° with the cords in said plies crossing each other and being inclined in opposite directions with respect to the circumferential direction of said tire, and a fourth belt ply is reinforced with cords having a cord angle with respect to the circumferential direction of said tire of 20°.

6. A pneumatic radial tire according to claim 1, wherein said distance L satisfies $0.25TW \leq L \leq 0.38TW$ with respect to the axial tread width TW of the ground-contacting portion of said tread.

* * * * *